No. 737,956. PATENTED SEPT. 1, 1903.
E. NICHOLSON.
DISTANCE OR RANGE FINDER.
APPLICATION FILED NOV. 12, 1902.
NO MODEL. 2 SHEETS—SHEET 1.
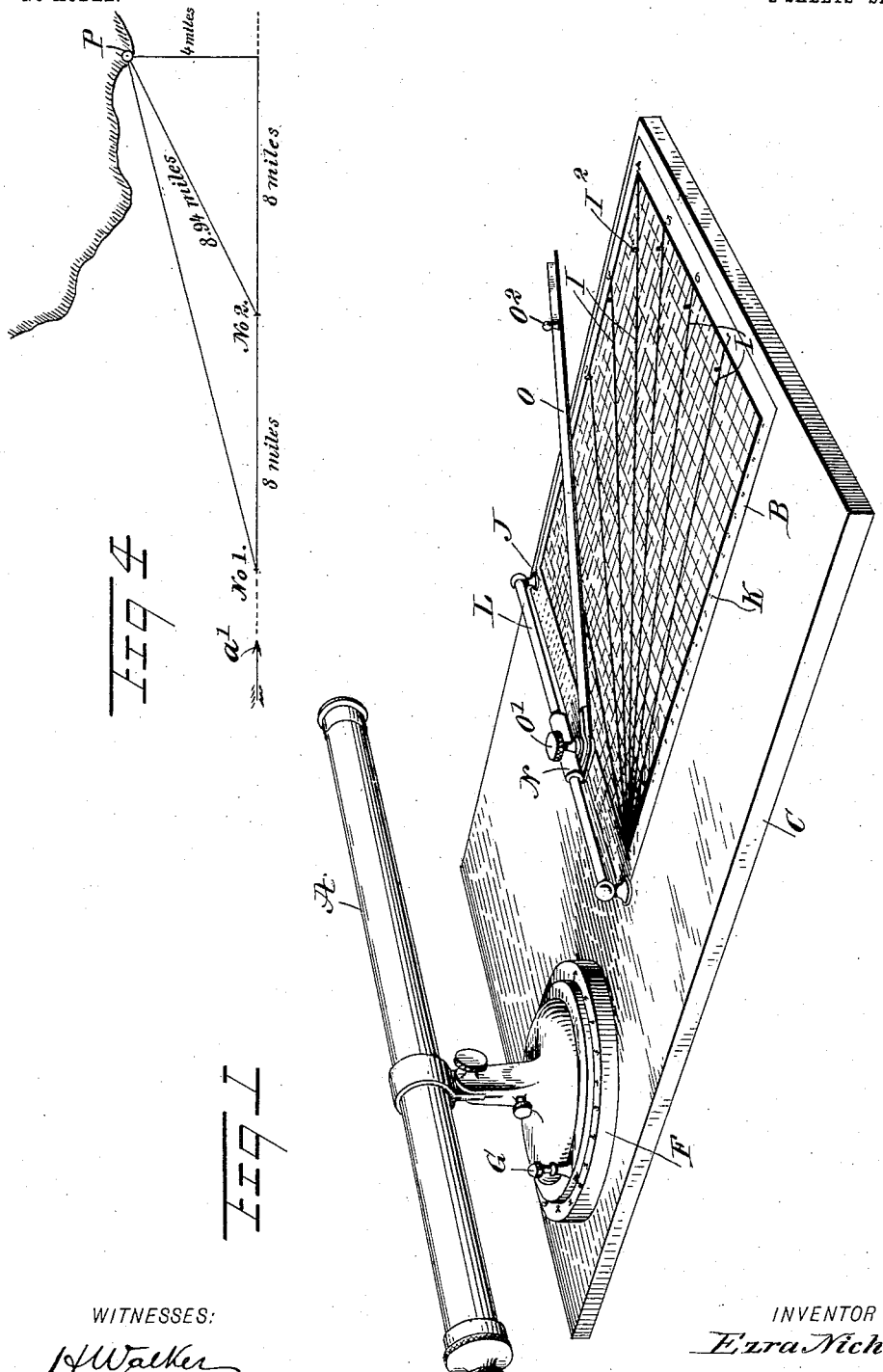
WITNESSES:
INVENTOR
Ezra Nicholson
BY
ATTORNEYS.

No. 737,956. PATENTED SEPT. 1, 1903.
E. NICHOLSON.
DISTANCE OR RANGE FINDER.
APPLICATION FILED NOV. 12, 1902.
NO MODEL. 2 SHEETS—SHEET 2.
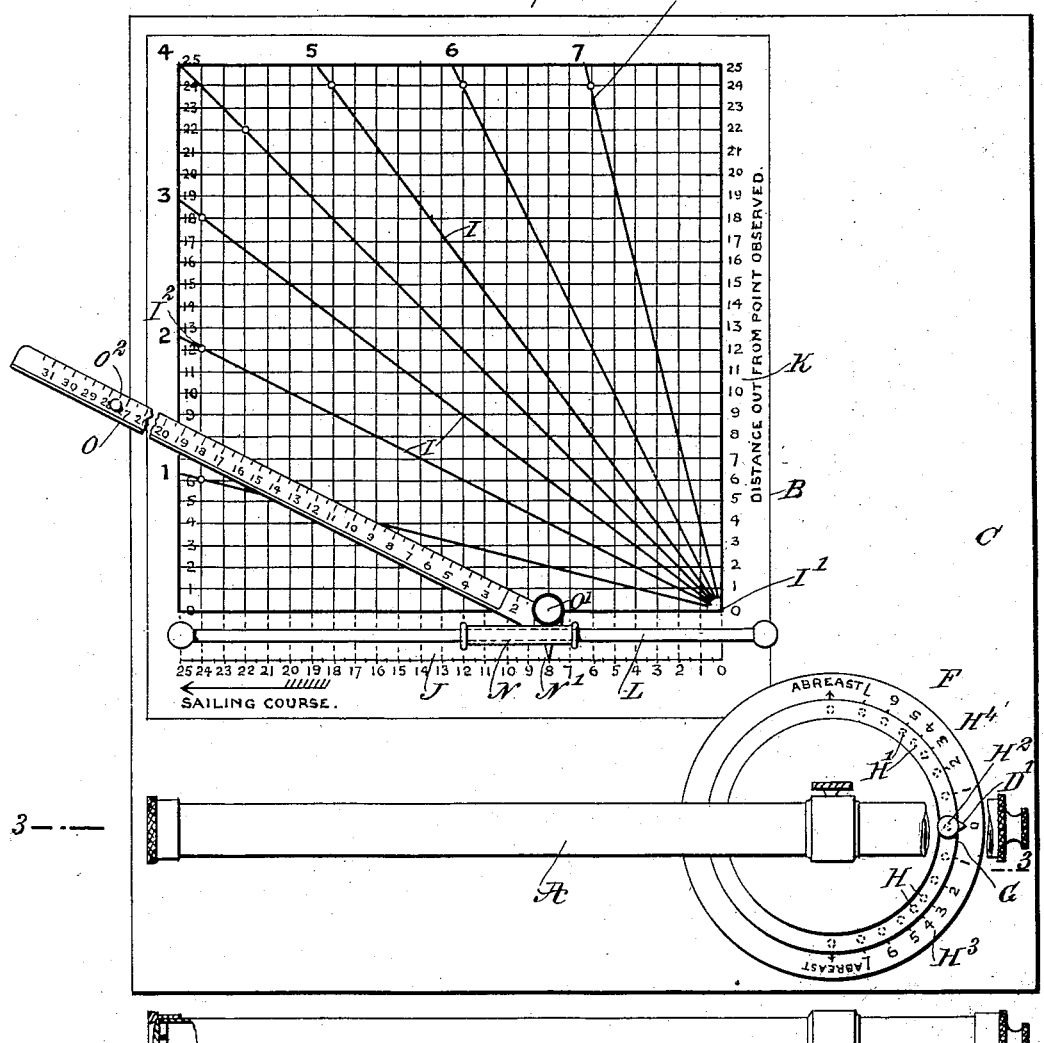

No. 737,956.

Patented September 1, 1903.

UNITED STATES PATENT OFFICE.

EZRA NICHOLSON, OF CLEVELAND, OHIO.

DISTANCE OR RANGE FINDER.

SPECIFICATION forming part of Letters Patent No. 737,956, dated September 1, 1903.

Application filed November 12, 1902. Serial No. 131,030. (No model.)

*To all whom it may concern:*

Be it known that I, EZRA NICHOLSON, a citizen of the United States, and a resident of Cleveland, in the county of Cuyahoga and State of Ohio, have invented a new and Improved Distance or Range Finder, of which the following is a full, clear, and exact description.

The object of the invention is to provide a new and improved distance or range finder, more especially designed for use on marine vessels and the like to enable the captain or other observer to readily ascertain the distance the vessel is from a distant point or object—say a lighthouse—how far the vessel has to sail before it is abreast of the lighthouse, and the distance between the vessel and the lighthouse when abreast, all without requiring any mathematical calculations.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement. Fig. 2 is a plan view of the same. Fig. 3 is a sectional side elevation of the same on the line 3 3 of Fig. 2, and Fig. 4 is a diagrammatic view illustrating the use of the instrument.

The distance or range finder consists, essentially, of a telescope A and a chart B, both preferably arranged on a board or other suitable support C, as indicated in the drawings, it being, however, expressly understood that the telescope and chart may be separately mounted, if desired.

The telescope A is pivoted on a carrier D, mounted to turn on an upright pivot E, arranged on a base F, shown in the drawings as secured to the support C. On the carrier D is held a spring-pressed pin G, adapted to engage one of two series of apertures H and H', arranged in a circle on the base F, one of the apertures, $H^2$, being common to both series of apertures. The series of apertures H and H' represent angular graduations $H^3$ and $H^4$, each indicating the angles or deviation between the distant point or object to the right or left of the vessel and the sailing course of the vessel. The graduations $H^3$ and $H^4$ are consecutively numbered from the aperture $H^2$ as zero, and the last or eighth apertures are marked "Abreast" and stand ninety degrees from the zero-aperture $H^2$. (See Fig. 2.) The support C for the base F of the telescope is mounted on the vessel in such a manner that when the pin G engages the zero-aperture $H^2$ then the telescope stands in the direction of the sailing course of the vessel, and when the pin engages either of the abreast-apertures in the series of apertures H or H' then the telescope stands at right angles, or abreast of the sailing course. When the pin G engages an aperture intermediate of the zero and abreast aperture, then the telescope stands in an angular position, and the angle is indicated by the corresponding numeral on the graduation $H^3$ or $H^4$.

The chart B is provided with a series of lines I, radiating from a common center or zero-point I', and the said radiating lines correspond to the graduations $H^3$ and $H^4$ on the base F. The radial lines I overlie a network of lines representing scales J and K, of which the lines of the scale J stand at right angles to the lines of the scale K and the lines in each scale are spaced equidistant apart. The lines of the scale J are parallel to the sailing course of the vessel and are consecutively numbered to indicate the distance the ship has traveled between successive points of observation. The numerals on the scale represent miles, knots, or other suitable units of linear measure. The lines on the scale K indicate the distance out from the point observed and are likewise consecutively numbered, the numbers representing corresponding units of linear measure, such as miles, knots, and the like. The lines of the scales J and K are numbered consecutively from a common zero-point, which coincides with the common center I' of the radial lines I, as plainly indicated in Fig. 2.

Parallel with the zero-line of the scale J is arranged a guideway L, on which is mounted to move, a slide N, having a pointer N', indicating on the numerals of the scale J, and on the said slide N is pivoted at O' a graduated index-arm O, having a linear graduation corresponding to the graduations on the scales J and K. The pivot O' for the index-arm O has its axis over the zero-line of the scale J, so that when the slide N is at the right-hand end of the guideway L the said axis of the pivot coincides with the zero-point I' of the lines I and the scales J and K.

Near the free end of the index-arm O is arranged a handle O², adapted to be taken hold of by the operator to swing the index-arm when in a zero position in alinement with any one of the radial lines I, numbered consecutively the same as the apertures H and H' of the graduations H³ and H⁴. Near the end of each of the lines I is arranged a pin I² for the front edge of the index-arm O to abut against when it is desired to accurately set the index-arm along one of the said lines for the purpose hereinafter more fully described.

The device is used as follows: When a vessel is sailing in the direction of the arrow a' (see Fig. 4) and the captain of the vessel is desirous of finding how far abreast his sailing course is from, say, a lighthouse P, then the observer sets the telescope A so that the pin G engages the first aperture, marked "1," on the graduation H⁴, as the lighthouse is on the left-hand side of the vessel, and the observer looking through the telescope and seeing the lighthouse P through the telescope makes note of this point "1" and at the same time notes down the log of the vessel, and then the observer sets the telescope with the pin G in the aperture marked "2" on the graduation H⁴, and then watches through the telescope until the lighthouse P is in range. He now marks down point number "2" and again reads the log of the vessel and finds that the distance traveled between the two observations is, say, eight miles. The operator now turns to the chart and with the pivot O' at the zero-point I' sets the index-arm O to the line I, indicated by the numeral "2," which corresponds to that of the last observation of the telescope, and then the operator slides the slide N along the guideway L until the pointer N' indicates the eight miles on the scale J, which corresponds to the eight miles the vessel traveled between the two points of observation. The operator now notes the intersection of the reading edge of the index-arm O with the line I, marked "1," which corresponds to the position of the telescope at the first point of observation, and there finds at this intersecting point, by reading the corresponding line J, that the distance the vessel will be from the lighthouse when abreast is four miles, and by reading along the corresponding line K it will be found that the distance the vessel is out from the lighthouse is eight miles, and the distance the vessel is from the second point of observation and the lighthouse is close to nine (eight and ninety-four one-hundredths) miles, reading along the graduation on the index-arm O. Thus without any mathematical calculations whatever the captain of the vessel is enabled to readily find three distances by the use of the telescope, the log, and the chart, as above described.

In practice the telescope A and its mounting is located in the pilot-house, and the base F is fastened in such a manner that when the telescope A is in zero position it stands in line with the sailing course, but it is not absolutely necessary that the chart B be connected with the same foundation on which the base F is fastened, as the said chart B can be independently handled after the points of observation are obtained to produce the desired result.

If the lighthouse or other point to be observed is located on the right-hand side of the vessel, then the telescope is set along the graduation H³, and if, for instance, the telescope is set at the point "1" at the first observation and at the point "3" at the second observation and the distance the ship has traveled between the points of observation is sixteen miles then the operator sets the index-arm O (then in zero position) onto the line I marked "3" and then slides the slide N along on the scale J until the pointer N' is at sixteen miles and notes the intersection of the index-arm O with the line "1" and finds that the graduation on the index-arm O reads ten miles, which indicates the distance the ship is from the lighthouse at the second point of observation, and finds that the vessel has to sail eight miles farther to be abreast of the lighthouse and to be then four miles abreast of the lighthouse.

Having thus described my invention, I claim as new and desire to secure by Letters Patent—

1. A distance or range finder for marine vessels and the like, comprising a telescope, a carrier on which the telescope is pivoted, a fixed base on which the carrier is mounted to turn, the said base being provided with two series of apertures arranged in the arc of a circle on the base, one of the apertures being common to both series of apertures, the common aperture representing a zero graduation and the remaining apertures representing angular graduations each indicating the angle or deviation between a distant point or object to the right or left of the vessel, and the sailing course of the vessel, the graduations being consecutively numbered from the zero-aperture and the last aperture of each series standing ninety degrees from the zero-aperture, and a spring-pin carried by the said carrier and adapted to engage any one of said apertures, to fix the telescope in zero position to range in the direction of the sailing course of the vessel, or to fix the telescope in angular position to the sailing course when pointing to a distant object, as set forth.

2. A distance or range finder for marine vessels and the like, comprising a telescope, a base on which the telescope is mounted to rotate, the base being provided with a zero graduation indicating the sailing course of the vessel and graduations arranged at each side of the zero graduation and indicating the angle or deviation between the distant point or object to the right or left of the vessel, and the sailing course of the vessel, means for fixing the telescope in zero or in angular position, a calculator provided with a chart having a radial graduation corresponding to that of the said base, the zero-line of said graduation standing in the direction of the sailing course, scales standing at right angles on the said chart and intersected by the said radial lines, a guideway on the chart parallel with the sailing course, a slide movable on said guideway in the direction of the sailing course, and an index-arm pivoted on the slide and movable over the chart, as set forth.

3. A distance or range finder for marine vessels and the like, comprising a base, a carrier mounted to turn on the base, a telescope carried by said carrier, the said base being provided with a zero graduation, and graduations arranged in the arc of a circle at each side of the zero graduation and consecutively numbered, means for fixing the telescope in zero position to range in direction of the sailing course of the vessel and for fixing the telescope in angular position to the sailing course when pointing to a distant object, the deviations from the zero position being indicated on the said graduations, a calculator comprising a chart having parallel sailing-course lines for indicating the distance of the course sailed, a set of observation-point lines at right angles to the sailing-course lines for indicating the distance out from the point observed, a set of radial lines radiating from a zero-point common to both sets of sailing-course lines and observation-point lines, the said radial lines corresponding to the graduations on the base, the zero-line of said set of radial lines being parallel with the telescope when the latter is in zero position, a guideway parallel with the said zero-line, a slide mounted to slide on said guideway and adapted to move in direction of the sailing-course lines, and a graduated index-arm pivoted on the slide and movable over the chart, the pivot of the said index-arm being in alinement with the said zero-line of the graduation, as set forth.

4. A distance or range finder provided with a chart having parallel sailing-course lines for indicating the distance of the course sailed, a set of observation-point lines at right angles to the sailing-course lines for indicating the distance out from the point observed, a set of radial lines radiating from a zero-point common to the sets of sailing-course lines and observation-point lines, a guideway parallel with the zero-line of the sailing-course lines, a slide mounted to slide on said guideway and adapted to move in the direction of the sailing-course lines, and an index-arm pivoted on the slide and extending over the chart, the axis of the pivot of the said index-arm being in alinement with the zero-line of the sailing-course lines and adapted, when the slide is at one end of the guideway, to coincide with the common zero-point, as set forth.

5. A distance or range finder provided with a chart having parallel sailing-course lines consecutively numbered and representing a scale for indicating the distance of the course sailed, a set of observation-point lines at right angles to the sailing-course lines for indicating the distance out from the point observed, a set of radial lines radiating from a zero-point common to both sets of sailing-course lines and observation-point lines, a guideway parallel with the sailing-course lines, a slide mounted to slide on said guideway and adapted to move in the direction of the sailing-course lines, the said slide being provided with a pointer indicating on the sailing-course scale, and an index-arm pivoted on the slide and extending over the said chart, the pivot of the said index-arm being in alinement with the zero-line of the sailing-course lines, as set forth.

6. A distance or range finder, comprising a support, a graduated base on the support, a carrier mounted to turn on the graduated base, a telescope carried by the carrier, the said base being provided with apertures arranged in a semicircle, the middle aperture representing a zero graduation and the remaining apertures representing graduations numbered consecutively from the zero-aperture, the end apertures standing respectively ninety degrees from the middle or zero aperture, a spring-pin carried by said carrier and adapted to engage any one of said apertures, a chart arranged on the support and having a radial graduation corresponding to that of the base, the chart having parallel sailing-course lines, and a set of observation-point lines, at right angles to the sailing-course lines, as set forth.

7. A distance or range finder comprising a support, a graduated base on the support, a carrier mounted to turn on the graduated base, a telescope pivoted on the carrier, means for securing the carrier to the base to fix the telescope in zero position to range in the direction of the sailing course of the vessel or to fix the telescope in angular position to the sailing course when pointing to a distant object, the deviation from the zero position of the sailing course being indicated on the said graduation, a chart arranged on the said support and having parallel sailing-course lines, a set of observation-point lines at right angles to the sailing-course lines, and a set of radial lines radiating from a zero-point common to both sets of sailing-course lines and observation-point lines, a guideway on the said support parallel with the sailing course, a slide mounted to move on said guideway, and an index-arm pivoted on the slide and movable over the chart, the axis of the pivot of the index-arm being in alinement with the zero-line of the sailing-course lines and adapted, when the slide is at one end of the guideway, to coincide with the common zero-point, as set forth.

In testimony whereof I have signed my name to this specification in the presence of two subscribing witnesses.

EZRA NICHOLSON.

Witnesses:
W. H. PIERSON,
H. J. HART.